United States Patent [19]

Rautenberg

[11] Patent Number: 4,519,567
[45] Date of Patent: May 28, 1985

[54] MOLD FOR MANUFACTURING AN ANNULAR OBJECT OF ELASTIC MATERIAL

[75] Inventor: Karl Rautenberg, Hyltebruk, Sweden

[73] Assignee: Forsheda AB, Forsheda, Sweden

[21] Appl. No.: 580,931

[22] Filed: Feb. 16, 1984

Related U.S. Application Data

[63] Continuation of Ser. No. 432,763, Oct. 4, 1982, abandoned.

[30] Foreign Application Priority Data

Feb. 10, 1982 [SE] Sweden .............................. 8105825

[51] Int. Cl.³ ............................................... B29B 1/14
[52] U.S. Cl. ........................................ 249/57; 249/85; 249/91; 264/275; 264/279; 264/279.1
[58] Field of Search ................... 249/57, 85, 91, 96; 264/262, 271.1, 275, 278, 279, 279.1; 425/116, 124, DIG. 42, DIG. 47

[56] References Cited

U.S. PATENT DOCUMENTS

| | | | |
|---|---|---|---|
| 1,592,671 | 7/1926 | Nichols | 264/275 |
| 2,110,091 | 3/1938 | Morse | 249/91 |
| 2,800,731 | 6/1957 | Carson | 249/91 |
| 3,134,143 | 5/1964 | Ludewig et al. | 249/91 |
| 3,246,369 | 4/1966 | Rhoads et al. | 249/85 |
| 4,381,908 | 5/1983 | Roth | 264/275 |

FOREIGN PATENT DOCUMENTS

| | | | |
|---|---|---|---|
| 608717 | 9/1948 | United Kingdom | 264/275 |
| 698488 | 10/1953 | United Kingdom | 264/275 |

Primary Examiner—Caleb Weston
Attorney, Agent, or Firm—Holman & Stern

[57] ABSTRACT

A mold for manufacturing an annular object of elastic material such as a sealing ring having a reinforcing element which is completely or partially embedded therein, comprising support surfaces on pin members supported by the mold and projecting into the mold cavity which support and retain the reinforcing element in the correct position within the mold during injection of the elastic material to be formed within the mold cavity. The pin and the mold cavity have opposing surfaces which guide the inserted reinforcing element into the correct position prior to injection of the elastic material. The mold is made in separate parts so that the parts can be removed after the elastic material has set, to open the cavity for removal of the finished product with the reinforcing element embedded therein.

9 Claims, 3 Drawing Figures

MOLD FOR MANUFACTURING AN ANNULAR OBJECT OF ELASTIC MATERIAL

This is a continuation of application Ser. No. 432,763 filed Oct. 4, 1982 now abandoned.

BACKGROUND OF THE INVENTION

1. Field of the Invention

The present invention relates to a mould for manufacturing an annular object of elastic material, preferably a sealing ring, having a reinforcing element which is completely or partially embedded in said object.

2. Description of the Prior Art

Sometimes it is desirable to provide sealing rings manufactured from rubber or another rubber elastic material with different kinds of reinforcing elements of rigid material, for example metals or hard plastic materials. For example the reinforcing elements can have purpose of improving the retaining of such sealing rings which are adapted for the sealing of pipes in the grooves formed in the pipe walls. Thereby, the sealing rings are prevented from being pushed out from the grooves when the pipe joints are mounted or from being blown out from the pipe joints when the differences between the pressures at each side of the joints are great. It is previously known either to provide the sealing rings with reinforcing elements which are connected with the rings after the manufacturing thereof or even after the sealing rings have been positioned in the grooves in the pipe wall or to provide the sealing rings with reinforcing elements which are connected with the sealing rings while the rings are manufactured and which can be completely or partially embedded in the material of the sealing rings.

Recently, it has also been proposed to position sealing rings provided with reinforcing elements in grooves in the pipe walls by forming the pipe walls around the sealing rings, whereby the sealing rings themselves will form the grooves in which the rings are positioned. This method of forming the grooves of the pipe walls and concurrently position the sealing rings provided with reinforcing elements in the grooves has been used especially in connection with plastic pipes. Thereby, a sealing ring which is provided with a reinforcing element is positioned on a forming mandrel, whereupon the plastic pipe wall which has been softened by means of heating is pushed over the mandrel and the sealing ring positioned thereon. The pipe wall is formed around the outer peripheral surface of the sealing ring for forming a groove which partially receives the sealing ring. After the pipe wall has been cooled and solidified the pipe wall is removed from the mandrel, the sealing ring thereby being retained in the groove. Because of the fact that the sealing ring is provided with a reinforcing element the sealing ring will be securely retained in the groove.

Especially in connection with the last mentioned method of positioning a sealing ring provided with a reinforcing element in the groove of the pipe wall it is of great importance that the reinforcing element is connected with the sealing ring in a correct and exact way.

For manufacturing an annular object of elastic material, preferably a sealing ring, having a reinforcing element which is completely or partially embedded in the object it is previously known to use a mold, in which the reinforcing element is positioned before the elastic material is supplied to the mold, said mold having support surfaces for supporting the reinforcing element in the mold. Thereby, it is a considerable problem to position and retain the reinforcing element in the mold in such an exactly predetermined way which is required for providing an acceptable final product, i.e. the sealing ring provided with a reinforcing element. In order to obtain an acceptable result it is not only required that the support surfaces of the mold are formed in a correct way but also that the reinforcing element is manufactured with extremely small tolerances. The last-mentioned requirement has been difficult to comply with, as it is necessary to manufacture the reinforcing elements from a material which is easy to work, preferably metal wire, unless the reinforcing element is not too expensive. However, there are substantial difficulties in using materials which are easy to work for the manufacturing of reinforcing elements having small tolerances. Another drawback is that reinforcing elements manufactured from such materials are easily deformed after the manufacturing thereof.

When manufacturing sealing rings provided with reinforcing elements by means of the previously known molds it is time-consuming to position the reinforcing elements in the mold cavity, and it has also occurred that the reinforcing element has taken a position outside the mold cavity so that the mold has been damaged during the closing thereof.

Thus, there exist substantial problems with regard to the manufacturing of sealing rings having reinforcing elements by means of the molds which are now used.

BRIEF SUMMARY OF THE INVENTION

The object of the invention is to provide a mold of the kind stated above, in which the reinforcing element can be positioned and retained in the mold in a correct position without any problems and also when the dimensions and shape of the reinforcing element are not absolutely correct.

In order to comply with this object the mold according to the invention is characterized by guiding surfaces positioned in the mold within a plane connected with a plane through the support surfaces and having adjacent the last-mentioned plane a diameter which is in substantial agreement with the inner diameter of the reinforcing element and which has a decreasing diameter in the direction upwards from the plane of the support surfaces, so that the guiding surfaces guide the reinforcing element to a correct position on the supporting surfaces in the mold and retain the reinforcing element in this position, when the reinforcing element is introduced into the mold.

In a mold of this kind the reinforcing element can be introduced into the mold very quickly and without using any substantial accuracy, as the reinforcing element is guided to the correct position on the support surface and is retained in this position during the following injection of the elastic material in the mold.

In a preferred embodiment of the invention the guiding surfaces are formed by pins projecting into the mold, said pins preferably forming the guiding surfaces as well as the support surfaces.

Preferably the guiding surfaces of the pins are positioned in a plane having the shape of a truncated cone and the plane of the support surfaces connects with a conical surface of the mold at the outer periphery of the plane of the support surfaces so that the conical surface of the mold constitute together with the planes of the support surfaces and the guiding surfaces an upwardly widening groove for the guiding and retaining of the reinforcing element.

BRIEF DESCRIPTION OF THE DRAWINGS

The invention is described in the following detailed description with reference to the accompanying drawings wherein.

DETAILED DESCRIPTION

Figure 1:
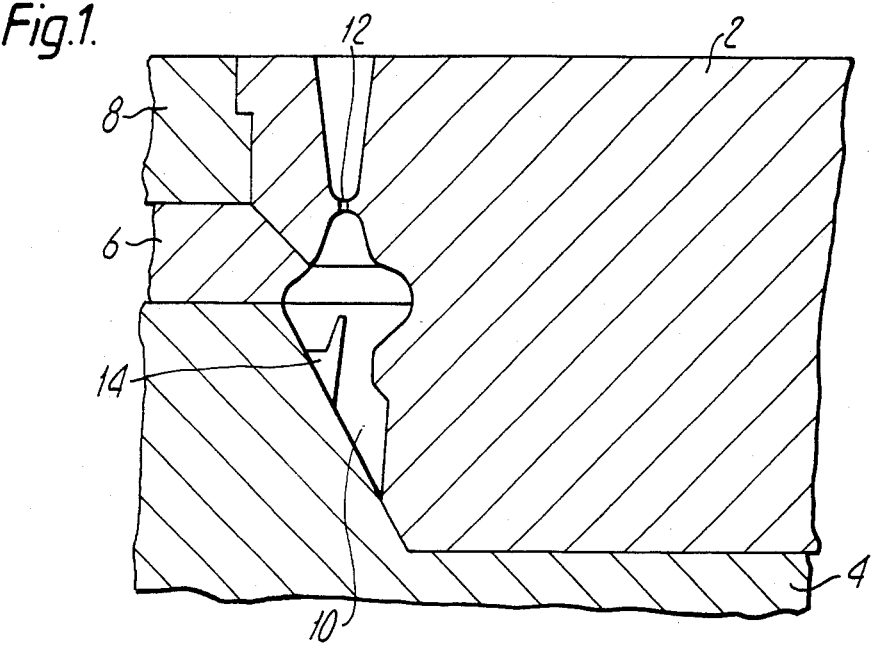
FIG. 1 is a partial vertical cross-sectional view of a mold according to the invention.
Figure 2:
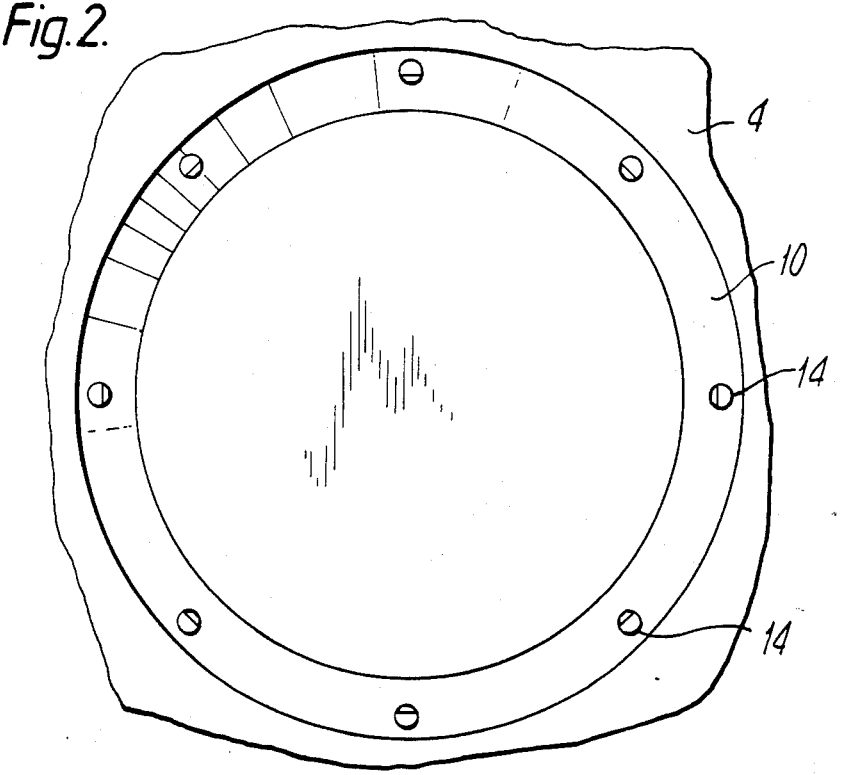
FIG. 2 is a top plan view of the lower portion of the mold cavity of the mold according to FIG. 1.
Figure 3:
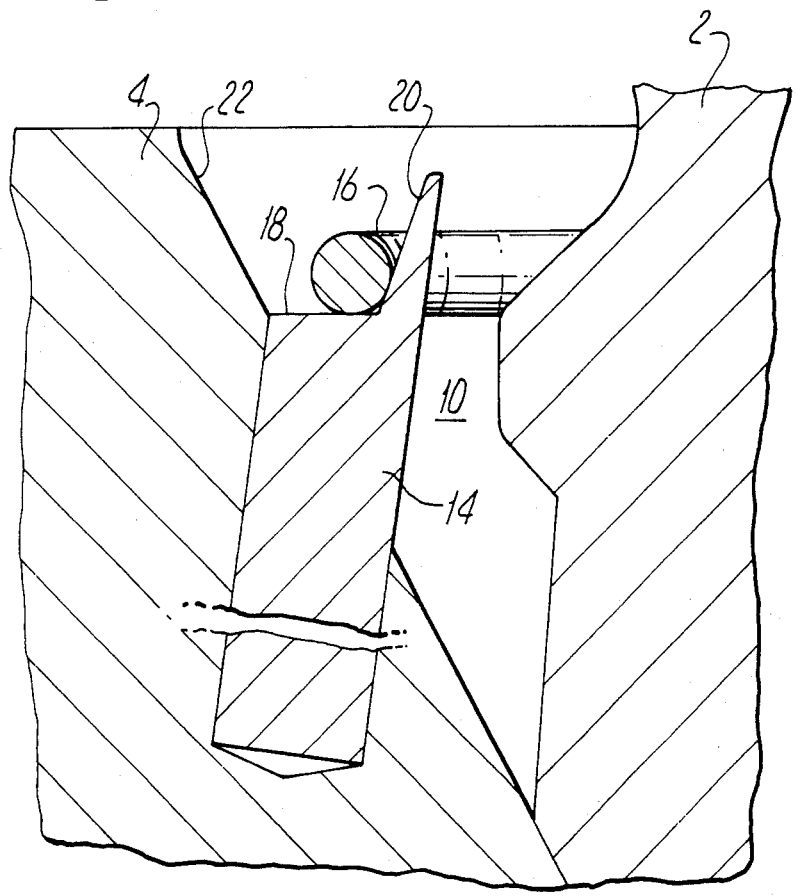
FIG. 3 is a partial vertical cross-sectional view on an enlarged scale of the lower portion of the mold cavity of the mold according to FIGS. 1 and 2.

In a conventional way the mold according to the invention shown in the drawings comprises a number of mold portions 2, 4, 6 and 8 which in a way which is not shown in detail but is of the conventional kind cooperate and are guided in relation to each other for constituting a mold cavity 10 for forming a sealing ring consisting of rubber and provided with a reinforcing element. The unvulcanized rubber material is suppled to the mold cavity 10 through an inlet or sprue 12 at the upper portion of the mold cavity. In the cavity 10 there are provided a number of pins 14 projecting into the cavity. In the embodiment shown in the drawings the number of pins 14 is eight. The pins are intended to guide and support a reinforcing element 16 which is adapted to be embedded in the sealing ring formed in the cavity 10. In the embodiment shown in the drawings the reinforcing element 16 has the form of an annular wire having a circular cross-section.

Each pin 14 constitutes a horizontal support surface 18 and a guiding surface 20 facing the outer periphery of the mold cavity and being inclined in relation to the vertical plane. All of the pins 14 have their support surfaces 18 positioned in an annular horizontal plane and their guiding surfaces 20 positioned in a plane which substantially corresponds to a truncated cone having an upwardly decreasing diameter.

Near its lower edge which connects with the plane of the support surfaces 18 the plane of the guiding surfaces 20 which as mentioned has the shape of a truncated cone has a diameter which is substantially equal to the inner diameter of the reinforcing element 16. In the embodiment shown in the drawings, the plane of the guiding surfaces 20 encloses an angle of 20° in relation to the vertical plane and the axis of the pins forms an angle of 8° with the vertical plane.

When the mold is open, i.e. when the portions 2, 6 and 8 are raised from the portion 4, the reinforcing element 16 can be positioned in the cavity 10 in a simple and accurate manner by being placed onto the support surfaces 18 of the pins, the reinforcing element 16 being thereby guided to a correct position and being also retained in a correct position by the engagement with the guiding surfaces 20 of the pins 14. Also, when the reinforcing element 16 is somewhat deformed, for example somewhat non-circular or provided with a portion which is not positioned in the plane of the reinforcing element, it is possible to provide a secure retaining of the reinforcing element 16 in the cavity 10 in a mold according to the invention.

After the mold has been closed, i.e. after the portions 2, 6 and 8 have taken their positions shown in FIG. 1, the unvulcanized rubber material is injected through the sprue 12 into the cavity 10. Because of the fact that the sprue 12 is directed downwardly toward the cavity the injection pressure will act for retaining the reinforcing element in correct position on the support surfaces 18.

When the rubber material has vulcanized, the mold is opened and the sealing ring provided with the reinforcing element 16 is removed from the cavity 10.

As appears from the above description it is simple to manufacture a sealing ring provided with a reinforcing element by means of a mold according to the invention, the problem of providing a correct position of the reinforcing element in the sealing ring being obviated. In the embodiment of the invention shown in the drawings the surface of the mold cavity opposite to the guiding surfaces 20, i.e. the surface 22 of the mold cavity, has a diameter which conically decreases in the downward direction. This shape of the surface 22 also contributes to the fact that it is easy to position the reinforcing element 16 in a correct position in the mold cavity.

The invention can be modified within the scope of the following claims. Thus, it is of course possible to provide the mold with a greater or smaller number of support and guiding surfaces and to form the portions of the mold provided with the support and guiding surfaces in another way than as pins projecting into the mold.

I claim:

1. A mold having a cavity for manufacturing an annular object of elastic material with an annular reinforcing element embedded therein, wherein the reinforcing element is positioned in the cavity before the elastic material is injected into the cavity, comprising:

a plurality of pins supported by the mold and projecting into the cavity;

a support surface on each pin extending in a common plane for supporting the reinforcing element in position in the cavity;

a guiding surface on each pin extending in a common truncated conical surface intersecting said common plane, the diameter of said truncated conical surface decreasing in the direction away from said common plane of said support surfaces and being substantially equal to the inner diameter of the reinforcing element at a plane passing through said truncated conical surface and extending in parallel adjacent spaced relationship with respect to said common plane of said support surfaces, so that said guiding surfaces guide the reinforcing element into correct position and retain the reinforcing element in correct position on said support surfaces when introduced into the mold; and a sprue for injection of elastic material extending through said mold and communicating with said cavity at a position substantially opposite to the plane of said supporting surfaces so that material injected through said sprue will act on the reinforcing element to retain it against said support and guiding surfaces.

2. A mold as claimed in claim 1 wherein the generatrix of the truncated conical surface intersects a plane passing perpendicularly through said common plane of said support surfaces at an angle of approximately 20°.

3. A mold as claimed in claim 1 wherein said pins are positioned in circumferential spaced relationship with respect to each other in the cavity.

4. A mold as claimed in claim 1 wherein said pins comprise uniform elongated members each having a central longitudinal axis which intersects a plane passing perpendicularly through the common plane of said support surface at an angle of approximately 8°.

5. A mold as claimed in claim 1 and further comprising a truncated conical second guiding surface on the mold cavity which joins said support surfaces and increases in diameter in the direction away from said support surfaces.

6. A mold as claimed in claim 1 wherein said mold comprises a plurality of mold parts having recesses therein which cooperate when said parts are assembled to form the cavity, and said pins are supported in one of said parts.

7. A mold as claimed in claim 6 wherein said pins are positioned in circumferential spaced relationship with respect to each other in the cavity.

8. A mold as claimed in claim 7 wherein said pins comprise uniform elongated members each having a central longitudinal axis which intersects a plane passing perpendicularly through the common plane of said support surface at an angle of approximately 8°.

9. A mold as claimed in claim 7 and further comprising a truncated conical second guiding surface on the mold cavity which joins said support surfaces and increases in diameter in the direction away from said support surfaces.

* * * * *

UNITED STATES PATENT AND TRADEMARK OFFICE
CERTIFICATE OF CORRECTION

PATENT NO. : 4,519,567
DATED : May 28, 1985
INVENTOR(S) : Karl Rautenberg

It is certified that error appears in the above-identified patent and that said Letters Patent is hereby corrected as shown below:

On the title page, Item [30], "Feb. 10, 1982" should read -- Oct. 2, 1981 --.

Signed and Sealed this

Twelfth Day of November 1985

[SEAL]

Attest:

DONALD J. QUIGG

Attesting Officer

Commissioner of Patents and Trademarks